W. H. WARD.
Vehicle-Wheel Hub.
No. 218,094. Patented July 29, 1879.
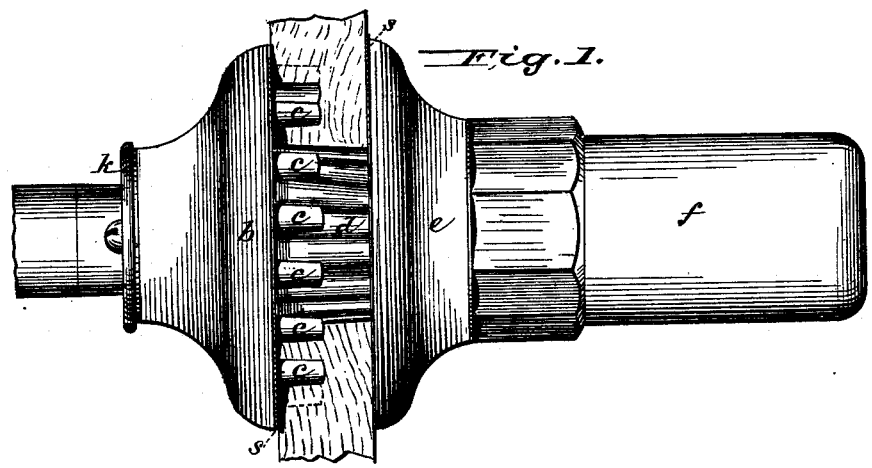
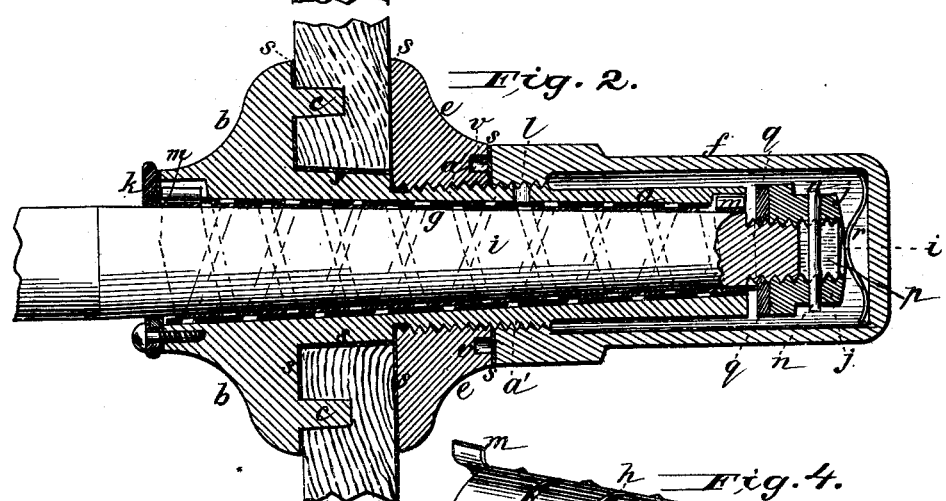
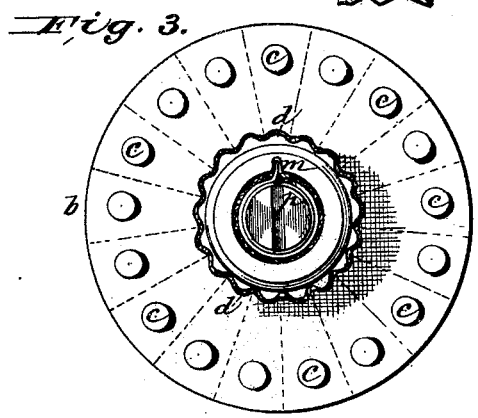
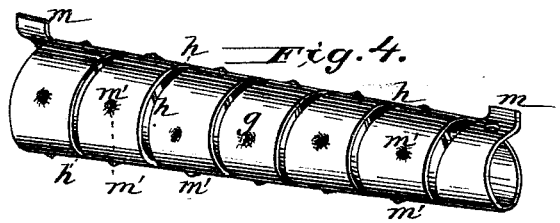
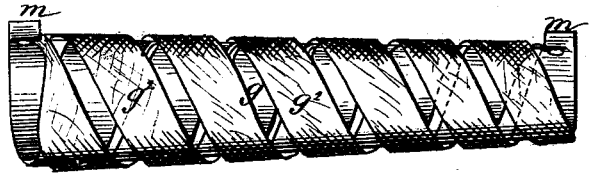
Attest:
H. D. Perkins
Floyd Norris
William H. Ward
Inventor.
By Johnson & Johnson
Atty's

UNITED STATES PATENT OFFICE.

WILLIAM H. WARD, OF PITTSBURG, PENNSYLVANIA.

IMPROVEMENT IN VEHICLE-WHEEL HUBS.

Specification forming part of Letters Patent No. 218,094, dated July 29, 1879; application filed January 4, 1879.

*To all whom it may concern:*

Be it known that I, WILLIAM HENRY WARD, formerly of Auburn, New York, but now of Pittsburg, in the county of Allegheny and State of Pennsylvania, have invented certain new and useful Improvements in Wheel-Hubs and Axle-Bearings, of which the following is a specification.

The invention embraces a wear-lining for the hub, formed of a metal strip wrapped spirally, so as to make a tube adapted to the tapering axle-bearing, and having an endwise spring capacity given to it by a spiral space between the edges of the spiral wraps, and in which such spirally-formed space is adapted to carry the lubricant to the end of the axle and keep it in motion as the wheel turns.

The endwise spring of the spirally-wrapped tube allows the spirals to be forced together, to compensate for the wear of its inner surface, and also keep the wheel tight upon the axle. When worn so that the wrapped tube fails to sufficiently tighten the wheel, the spirally-formed tube is removed from the hub and wrapped with some suitable fabric, and again inserted into the hub and secured. It is replacable when worn out, and is locked to the hub, so that it cannot turn independently of it. Its coils stand in reverse direction for each end of the axle, so as to cause the oil to be moved toward the ends of the axle.

The pipe-box has formed integral therewith the inside hub-head, with spoke-locking pins and a corrugated seat for the ends of the spokes, while an outside screw-head and a sleeve lock-nut covering the pipe-box complete the hub proper and bind the spokes in place.

The wearing - tube spirals are kept with proper bearing upon the axle by a nut on the end of the axle bearing against the end of said spiral tube, and the nut, when set, is locked by a cross-pin passing through the nut and a slot in the axle, so that the wheel can be properly set and tightened, as may be required, by forcing it farther up the inclined axle.

A spring in the outer closed end of the sleeve lock-nut bears against the inner lock-nut or end of the axle, to neutralize the side motion of the wheel upon the axle, so that the spiral wearing-tube cushions the hub sidewise, while the end spring cushions the axle sidewise, and thus provides for end motion of the axle and side motion of the wheel without jar or noise.

The joints of the several parts are provided with suitable packing or cushions, to prevent all rattling, exclude dust, and prevent leakage of the lubricant.

The axle-bearing has no shoulder or collar at the inner hub-head for securing the wheel in place; but the covering sleeve-nut secures all the parts to the pipe-box and forms the outer closed end and finish of the hub, while the inner lock-nut secures the wheel upon the tapering axle without shoulders.

Referring to the drawings, Figure 1 represents an elevation of my improved hub and axle, the spokes being removed; Fig. 2, a longitudinal section of the same; Fig. 3, an end view, showing the pipe-box,inner hub-head, its spoke-locking pins, and the corrugated seat for the ends of the spokes; Fig. 4, the spirally-formed metal wearing-tube detached from the hub pipe-box, and Fig. 5 the spirally-formed tube as wrapped for use.

The hub is of metal, and consists of a pipe-box, $a$, having the inner hub-head, $b$, with the spoke-locking pins $c$, and a corrugated seat, $d$, for the ends of the spokes, cast together, while the outer spoke-head, $e$, screws upon the pipe-box against the spokes, and is locked in place by a sleeved nut, $f$, which also forms the outer closed end of the hub, and is screwed upon the threaded part $a'$ of the pipe-box.

A wearing lining, consisting of a spirally-wrapped metal strip, forming a spring-tube, $g$, with a spiral space, $h$, between the coils, is fitted within the pipe-box, which is sufficiently larger than the axle-bearing $i$ for this purpose, and forms the wear-surface of the hub, with adaptation for having its coils adjusted closer together, as circumstances may require, and compensate for the wear of the inner surface of the tube. This adaptation for endwise adjustment gives the tube a spring capacity, the force of which is exerted upon an adjusting-nut, $j$, on the end of the axle, and a ring, $k$, which closely fits the axle at the end of the inner hub-head, so that the spiral form of the wear-tube constantly tends to press the wheel inward on the tapering axle-bearing.

The lubricant is introduced into the pipe-box through a hole, $l$, which is covered by the sleeve-nut $f$ against dust and leakage.

The spiral space formed between the edges of the tube-coils ranges toward the end of the axle, to work the oil that way and give it motion as the wheel turns, while a packing secured by the ring $k$ seals the joint on the tapering axle at the inner end of the hub.

The spirally-wrapped wear-lining, when inserted into the pipe-box, is locked at each end by a turned-out lip, $m$, which enters a groove or slot in the pipe-box, so that the tube cannot turn independent of the hub.

Projections $m'$ on the outer surface of the spirally-formed tube by punctures aid in holding it by friction to the interior of the box $a$ at different points throughout its length.

The nut $j$ screws upon the end of the axle against the end of the spring-tube, which, for that purpose, projects beyond the end of the pipe-box, and by screwing up the nut $j$ the wheel will be forced farther up the incline of the axle, and thus be tightened as the inner surface of the spring-tube wears by contact with the axle-bearing.

When properly set the spring-tube is held by the nut $j$, which is itself locked by a pin, $n$, passing through it and a slot, $p$, in the end of the axle, so that by removing the pin the nut can be turned to tighten up the spring wear-tube and locked.

A washer, $q$, lessens the friction at the outer bearing of the spring-tube. As the wear of the tube increases, so that it cannot be tightened on the axle by the nut, it is removed and wrapped with suitable fabric, $g^2$, to render it tight within the pipe-box, and also on the axle when again inserted in place.

A suitable wrapping, however, is used in the first instance, if desired.

The spring wearing-tube is replaced when worn out. If made of sheet-brass, which I prefer, the axle-bearing will not wear, and it may be of any proper thickness and hardened to increase its tension.

Steel wire flattened by rolling, so as to leave the edges round, may be used to form the wear-tube, if desired.

The spring wear-tube constantly tends, by its bearing against the inner end of the axle-nut $j$, to force the wheel inward upon the tapering axle, while a spring, $r$, in the end of the sleeve-nut bears against the outer end of the nut or of the axle, and tends constantly to draw the wheel outward, thus neutralizing the side or lateral motion of the wheel, and lessening the bad effects of the end-thrusts of the axle.

The spring wear-tubes are formed with their spirals in reverse directions for each end of the axle, to work the oil toward the axle ends.

Suitable packing, $s$, is placed between the hub-heads and the spokes at the spoke ends, between the spokes, and between the sleeve-nut and the screw hub-head, to close the joints and prevent rattling or looseness of the parts.

The inner hub-head has pins $c$ on its face, arranged so that one will enter a recess in the side of the spoke end, and thus lock the spokes between the hub-heads, while the ends of the spokes are notched and fitted upon ribs or corrugated seats $d$ on the pipe-box, so as to secure them in place. These corrugations or spoke-end seats are formed upon a shoulder on the pipe-box in the space between the fixed and the screw hub-heads.

The screw hub-head has holes $v$ to receive a wrench, and the inner end of the covering-sleeve is formed like a nut, and a single wrench is adapted for these parts.

By this construction the wheel is secured to the axle by means applied directly to the end of the axle and the outer closed end of the hub-box, and thereby avoid the usual inner axle-shoulder, which weakens the axle.

The locking-sleeve nut closes the outer hub end, excludes dust, and confines the lubricant. The locking-sleeve, in fact, forms also a reservoir for the lubricant, as the wearing-surface of the axle and of the spiral wear-tube opens into this covering and securing-sleeve.

The outer hub-head and the sleeve-nut screw upon the same screw part of the pipe-box, so that when the outer hub-head is screwed hard up against the spokes to drive them over their securing-pins and clamp them to the inner hub-head the said outer hub-head is then locked tight by the screwing on of the covering-sleeve.

In addition to this, the outer hub-head may have one or more wood-screw holes through it, to allow of wood-screws being inserted through it into the spokes, as a preventive against its unscrewing by wear or jar.

The wrapping $g^2$ may be of prepared leather or other strips, and is wound upon the metal wear-lining in a reverse manner to the coiling of the said metal wear-lining, and serves to cushion the hub.

I claim—

1. The inner wear-lining of a wheel-hub, formed of a sheet-metal strip wound spirally, leaving an open spiral space extending from end to end.

2. The combination, with the pipe-box of a wheel-hub, of the inner wear-lining for the axle, formed of a sheet-metal strip wound spirally, and secured to the pipe-box by turn-out locking-lips at each end of the wound strip.

3. The combination of the wear-lining, formed of a sheet-metal strip wound spirally, to leave a spiral space for endwise springing and for the lubricant, with the pipe-box and an adjusting and confining nut on the axle end, for the purpose stated.

4. The combination, with the pipe-box of a wheel-hub, a sheet-metal spirally-formed wear-lining having endwise spring capacity, and an adjusting and confining nut therefor on the end of the axle, of a spring within the inclosing screw-sleeve, arranged to exert its force upon said sleeve and the axle, whereby to neutralize the spring action of the spiral skein and balance the side movement of the wheel.

5. The combination, with a wear-lining formed of a sheet-metal strip wound spirally, to obtain endwise spring capacity, and arranged within the pipe-box for adjustment to compensate for its wear, as described, of the adjusting-nut on the end of the axle, and a locking-pin, $n$, therefor, passing through said nut, and a cross-slot, $p$, in the axle, for the purpose stated.

6. The pipe-box $a$, having the screw-thread $a'$, the corrugated seats $d$, the inner hub-head, $b$, and the short locking-pin $c$, formed as an entirety, in combination with the outer screw hub-head, $e$, and the locking screw-hub sleeve $f$, closed at its outer end, adapted for use as described.

7. The wear-lining formed of a sheet-metal strip wound spirally, and turning with the wheel, having its coils and the spiral space formed thereby ranging toward the end of the axle, whereby to keep the lubricant in motion as the wheel turns.

8. A wear-lining formed of a sheet-metal strip wound spirally, leaving a spiral open space from end to end, wrapped with suitable material, to tighten it upon the axle-bearing, to compensate for the wear of the spiral skein, and to form a cushion for the hub.

In testimony whereof I have hereunto set my hand.

W. H. WARD.

Witnesses:
  JNO. D. THOMPSON,
  S. HARVEY THOMPSON.